United States Patent Office 3,738,823
Patented June 12, 1973

3,738,823
PROCESS OF KILLING UNDESIRED WEEDS
Delta W. Gier, Laurinburg, N.C., and Daniel M. Wasleski, Kansas City, Mo., assignors to Baychem Corporation, New York, N.Y.
No Drawing. Original application Oct. 16, 1967, Ser. No. 675,350, now abandoned. Divided and this application May 22, 1970, Ser. No. 38,649
Int. Cl. A01n 9/24
U.S. Cl. 71—108                     12 Claims

ABSTRACT OF THE DISCLOSURE

Compounds of the formulae

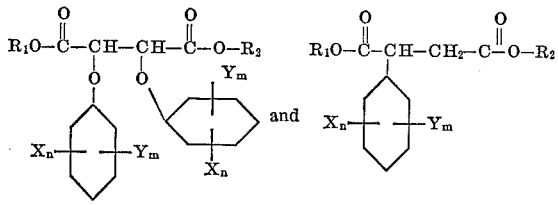

wherein $R_1$ and $R_2$ are hydrogen, alkyl, chloroalkyl, phenyl and alkyl phenyl, X is halogen, Y is nitro, $m$ is an integer from 1 to 2 and $n$ is an integer of 1 to 3 are useful as herbicides and desiccants and to a lesser extent as defoliants. For the best desiccant properties there should be a halogen in the ortho position of the chloronitrophenyl group.

---

This application is a division of our copending application Ser. No. 675,350, filed Oct. 16, 1967, now abandoned.

The present invention relates to novel herbicides and desiccants.

It is an object of the invention to develop improved compositions and methods for killing undesired plants.

Another object is to develop improved compositions and methods for desiccating plants.

Another object is to develop improved compositions and methods for defoliating plants.

Still further objects and the entire scope of applicability of the present invention will become apparent from the detailed description given hereinafter; it should be understood, however, that the detailed description and specific examples, while indicating preferred embodiments of the invention, are given by way of illustration only, since various changes and modifications within the spirit and scope of the invention will become apparent to those skilled in the art from this detailed descrption.

It has now been found that these objects can be attained by employing as herbicides, desiccants or defoliants compounds having one of the following formulae

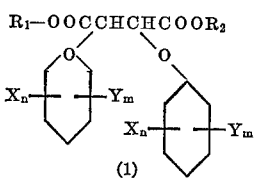

or

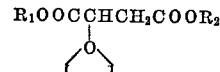

(2)

where $R_1$ and $R_2$ are hydrogen, alkyl, chloroalkyl, phenyl and alkylphenyl, X is halogen, preferably chlorine or bromine, Y is nitro, $m$ is an integer of 1 to 2 and $n$ is an integer of 1 to 3.

The compounds of Formula 1 of the present invention are prepared by reacting 1 mole of the appropriate halonitrophenol with 0.5 mole of the appropriate $\alpha,\beta$-dihalosuccinic acid or ester thereof. The compounds of Formula 2 are prepared by reacting 1 mole of the appropriate halonitrophenol with 1 mole of maleic acid or ester thereof. In perparing the compounds of Formulae 1 and 2 the reaction is carried out in the presence of a base, e.g. sodium hydroxide, potassium hydroxide or the like in the presence of an inert solvent, e.g. dimethoxyethane (ethylene glycol dimethyl ether) or acetone.

As the halonitrophenol there can be employed 2,4,5-trichloro-6-nitrophenol,
2,4-dichloro-6-nitrophenol,
2-chloro-4-nitrophenol,
2-nitro-4-chlorophenol,
2,4,6-trichloro-5-nitrophenol,
2,3,4-trichloro-5-introphenol,
2,6-dichloro-4-nitrophenol,
2-nitro-3,4-dichlorophenol,
3-chloro-4-nitrophenol,
2,4,5-tribromo-6-nitrophenol,
2,4-dibromo-6-nitrophenol,
2,4,5-trifluoro-6-nitrophenol,
2-chloro-4,6-dinitrophenol,
2,6-dichloro-4-nitrophenol,
2,3-dichloro-4,6-dinitrophenol.

As the dihalosuccinic acid compound or the maleic acid compound for reacting with the halonitrophenol there can be used $\alpha,\beta$-dichlorosuccinic acid, $\alpha,\beta$-dibromosuccinic acid, $\alpha,\beta$-dibromo dimethyl succinate, $\alpha,\beta$-dibromo diethyl succinate, $\alpha,\beta$-dibromo dibutyl succinate, $\alpha,\beta$-dibromo dihexyl succinate, $\alpha,\beta$-dibromo dicyclohexyl succinate, $\alpha,\beta$-dibromo-diphenyl succinate, $\alpha,\beta$-dibromo di-p-tolyl succinate, $\alpha,\beta$-dibromo di-2-chloroethyl succinate, $\alpha,\beta$-dibromo di-3-bromopropyl succinate, maleic acid, dimethyl maleate, diethyl maleate, dipropyl maleate, dibutyl maleate, diamyl maleate, dihexyl maleate, dioctyl, maleate, diphenyl maleate, di-p-tolyl maleate, di-p-butylphenyl maleate, di-2-chloroethyl maleate, di-3-chloropropyl maleate.

Examples of compounds useful in the present invention are $\alpha,\beta$-bis (2,4-dichloro-6-nitrophenyl) tartaric acid diether (prepared from 2,4-dichloro-6-nitrophenol and $\alpha,\beta$-dibromosuccinic acid), $\alpha,\beta$-bis (2,4,5-trichloro-6-nitrophenyl) tartaric acid diether,
$\alpha,\beta$-bis (2,4,5-trichloro-6-nitrophenyl) dimethyl tartrate diether,
$\alpha,\beta$-bis (2,4,5-trichloro-6-nitrophenyl) diethyl tartrate diether, α,β-bis (2,4,5-trichloro-6-nitrophenyl) dibutyl tartrate diether,
α,β-bis (2,4,5-trichloro-6-nitrophenyl) dihexyl tartrate diether,
α,β-bis (2,4,5-trichloro-6-nitrophenyl) dicyclohexyl tartrate diether,
α,β-bis (2,4,5-trichloro-6-nitrophenyl) dioctyl tartrate diether,
α,β-bis (2,4,5-trichloro-6-nitrophenyl) diphenyl tartrate diether,
α,β-bis (2,4,5-trichloro-6-nitrophenyl) di-p-tolyl tartrate diether,
α,β-bis (2,4,5-trichloro-6-nitrophenyl) di-p-butylphenyl tartrate diether,
α,β-bis (2,4,5-trichloro-6-nitrophenyl) di-2-chloroethyl tartrate diether,
α,β-bis (2,4,5-tribromo-6-nitrophenyl) tartaric acid diether,
α,β-bis (2,4,5-trifluoro-6-nitrophenyl) diethyl tartrate diether,
α,β-bis (2,4,dichloro-6-nitrophenyl) diethyl tartrate diether,
α,β-bis (2,4-dichloro-6-nitrophenyl) dimethyl tartrate diether,
α,β-bis (2,4-dichloro-6-nitrophenyl) dihexyl tartrate diether,
α,β-bis (2-chloro-4-nitrophenyl) tartaric acid diether,
α,β-bis (4-chloro-2-nitrophenyl) tartaric acid diether,
α,β-bis (2,6-dichloro-4-nitrophenyl) tartaric acid diether,
α,β-bis (4-chloro-2,6-dinitrophenyl) tartaric acid diether,
2,4,5-trichloro-6-nitrophenyl diethyl malate ether (from 2,4,5-trichloro-6-nitrophenol and diethyl maleate),
2,4,5-trichloro-6-nitrophenyl malic acid ether,
2,4-dichloro-6-nitrophenyl malic acid ether,
2,4,5-trichloro-6-nitrophenyl dimethyl malate ether,
2,4-dichloro-6-nitrophenyl di sec butyl malate ether,
2,4,5-trichloro-6-nitrophenyl dioctyl malate ether,
2,4,5-tribromo-6-nitrophenyl diisopropyl malate ether,
2-chloro-4-nitrophenyl diphenyl malate ether.

The compounds of the present invention can be used alone or they can be applied together with inert solids to form dusts, or can be suspended in a suitable liquid diluent, preferably comprising water.

There can also be added surface active agents or wetting agents and/or inert solids in the liquid formulations. In such case, the active ingredient can be from 0.01 to 95% by weight of the entire composition.

In place of water there can be employed organic solvents as carriers, e.g., hydrocarbons such as benzene, toluene, xylene, kerosene, diesel oil, fuel oil, and petroleum naphtha, ketones such as acetone, methyl ethyl ketone and cyclohexanone, chlorinated hydrocarbons such as carbon tetrachloride, chloroform, trichloroethylene and perchloroethylene, esters such as ethyl acetate, amyl acetate and butyl acetate, ethers, e.g., ethylene glycol monomethyl ether and diethylene glycol monomethyl ether, alcohols, e.g., ethanol, methanol, isopropanol, amyl alcohol, ethylene glycol, propylene glycol, butyl carbitol acetate and glycerine. Mixtures of water and organic solvents, either as solutions or emulsions, can be employed.

The novel compounds can also be applied as aerosols, e.g., by dispersing them in air by means of a compressed gas such as dichlorodifluoromethane or trichlorofluoromethane and other Freons, for example.

The compounds of the present invention can also be applied with adjuvants or carriers such as talc, pyrophyllite, synthetic fine silica, attapulgus clay (attaclay), kieselguhr, chalk, diatomaceous earth, lime, calcium carbonate, bentonite, fuller's earth, cottonseed hulls, wheat flour, soybean flour, pumice, tripoli, wood flour, walnut shell flour redwood flour and lignin.

As stated, it is frequently desirable to incorporate a surface active agent in the compositions of the present invention. Such surface active or wetting agents are advantageously employed in both the solid and liquid compositions. The surface active agent can be anionic, cationic or nonionic in character.

Typical classes of surface active agents include alkyl sulfonate salts, alkylaryl sulfonate salts, alkyl sulfate salts, alkylamide sulfonate salts, alkylaryl polyether alcohols, fatty acid esters of polyhydric alcohols and the alkylene oxide addition products of such esters, and addition products of long chain mercaptans and alkylene oxides. Typical examples of such surface active agents include the sodium alkylbenzene sulfonates having 10 to 18 carbon atoms in the alkyl group, alkylphenol ethylene oxide condensation products, e.g., p-isooctylphenol condensed with 10 ethylene oxide units, soaps, e.g., sodium stearate and potassium oleate, sodium salt of propylnaphthalene sulfonic acid (di-2-ethylhexyl), ester of sodium sulfosuccinic acid, sodium lauryl sulfate, sodium salt of the sulfonated monoglyceride of cocoanut fatty acids, sorbitan sesquioleate, lauryl trimethyl ammonium chloride, octadecyl trimethyl ammonium chloride, polyethylene glycol lauryl ether, polyethylene esters of fatty acids and rosin acids, e.g., Ethofat 7 and 13, sodium N-methyl-N-oleyltaurate, Turkey red oil, sodium dibutylnaphthalene sulfonate, sodium lignin sulfonate (Marasperse N), polyethylene glycol stearate, sodium dodecylbenzene sulfonate, tertiary dodecyl polyethylene glycol thioether (Nonionic 218), long chain ethylene oxide-propylene oxide condensation products, e.g., Pluronic 61 (molecular weight 1,000), sorbitan sesquioleate, polyethylene glycol ester of tall oil acids, sodium octyl phenoxyethoxyethyl sulfate, tris(polyoxyethylene) soribtan monosterate (Tween 60), and sodium dihexyl sulfosuccinate.

The solid and liquid formulations can be prepared by any of the conventional procedures. Thus, the active ingredient, in finely divided form if a solid, may be tumbled together with finely divided solid carrier. Alternatively, the active ingredient in liquid form, including solutions, dispersions, emulsion and suspensions thereof, may be admixed with the solid carrier in finely divided form.

The compounds of the present invention can be applied to soil, growing plants, e.g., trees, cotton plants, wheat and other grain plants, vegetable plants, seeds and fabrics.

Unless otherwise indicated, all parts and percentages are by weight.

EXAMPLE 1

In preparing the compounds set forth in Table 1, there was carried out either reaction A or B.

Reaction A

A solution of 0.1 mole of the appropriate phenol and 20 ml. of 10 normal aqueous sodium hydroxide in 200 ml. of dimethoxyethane was placed in a flask equipped with a mechanical stirrer and reflux condenser. 0.05 mole of α,β-dibromosuccinic acid was added and the mixture heated to reflux for 35–40 hours. The resulting solution was poured over chipped ice, acidified with hydrochloric acid, collected in a Buchner funnel, washed with water and dried under vacuum. The products thus produced were within Formula 1 supra.

Reaction B

A solution of 0.1 mole of 2,4,5-trichloro-6-nitrophenol, 0.1 mole of diethyl maleate, and 5 drops hydrochloric acid in 200 ml. of dimethoxyethane was placed in a flask equipped with a mechanical stirrer and a reflux condenser. The mixture was heated to reflux for 8 to 10 hours. The resulting solution was cooled, poured into 200 ml. of chloroform and subsequently washed with two 500 ml. portions of water. After drying over calcium sulfate, the chloroform was removed in a rotary evaporator under vacuum to give the desired product in fairly high purity. The product produced was within Formula 2 supra. It was 2,4,5-trichloro-6-nitrophenyl diethyl malate ether.

TABLE 1

| Compound | X | Y | R | Yield (percent) | M.P., °C. | $M_D^{20}$ | Formula |
|---|---|---|---|---|---|---|---|
| 1 | 2,4,5-trichloro | 6-nitro | H | 65 | 81 | | 1 |
| 2 | 2,4-dichloro | do | H | 55 | 87 | | 1 |
| 3 | 2-chloro | 4-nitro | H | 58 | 116 | | 1 |
| 4 | 4-chloro | 2-nitro | H | 62 | 95 | | 1 |
| 5 | 2,6-dichloro | 4-nitro | H | 73 | 135 | | 1 |
| 6 | 4-chloro | 2,6-dinitro | H | 71 | 88 | | 1 |
| 7 | 2,4-dichloro | Hydrogen | H | 88 | Liq. | 1.5195 | 1 |
| 8 | 2,4,5-trichloro | 6-nitro | Ethyl | 71 | Liq. | 1.4990 | 2 |

Compound 7 does not have a nitro group and is included to show the increased desiccant effect when a nitro group is present.

The compounds of the present invention have been applied in many instances as wettable powders consisting of 50% of the active ingredient, 46% ultra-fine silica (Hi-Sil), 2% sodium lignin sulfonate and 2% Pluronic L-61 (polyethylene oxide-polypropylene oxide adduct molecular weight about 1000). This wettable powder is hereinafter designated as Formulation A.

EXAMPLE 2

The compounds of the present invention were tested as defoliants and desiccants for cotton when applied as Formulation A dispersed in water. The results are set forth in Table 2 with the rates expressed in lbs./acre.

TABLE 2

| Compound | Rate | Percent defoliation | Percent desiccation |
|---|---|---|---|
| 1 | 8 | 0 | 90 |
|   | 2 | 0 | 90 |
| 2 | 8 | 0 | 90 |
|   | 2 | 0 | 90 |
| 3 | 8 | 17 | 90 |
|   | 2 | 14 | 70 |
| 4 | 8 | 0 | 30 |
|   | 2 | 0 | 0 |
| 5 | 8 | 33 | 90 |
|   | 2 | 33 | 80 |
| 6 | 8 | 0 | 30 |
|   | 2 | 0 | 10 |
| 7 | 8 | 0 | 50 |
|   | 2 | 15 | 30 |
| 8 | 8 | 0 | 100 |
|   | 2 | 0 | 100 |

It will be observed that the presence of halogen, e.g. chlorine or bromine in the ortho or 2 position rendered the compound much more effective as a desiccant, compare compound 3 with compound 4 or compound 6. It will also be observed that the presence of a nitro group enhances desiccant activity, compare compound 2 with compound 7. The desiccants also exhibited good regrowth control, low mammalian toxicity and non-corrosive properties.

EXAMPLE 3

The compounds of the present invention also showed pre-emergent and post-emergent herbicidal activity when using Formulation A at the indicated dosages of active ingredient in lbs./acre. The pre-emergent herbicide results are set forth in Table 3 and the post emergent herbicide results are set forth in Table 4. In Table 3 a 0–10 scale is employed with 0 indicating 100% germination and 10 indicating no germination. In Table 4 a 0–10 scale is employed with 0 indicating no kill and 10 indicating 100% kill.

TABLE 3

| Compound | Lbs./acre | Oats | Sugar beets | Radish | Flax | Wheat |
|---|---|---|---|---|---|---|
| 8 | 20 | 6 | 10 | 10 | 10 | 5 |
|   | 10 | 4 | 9 | 9 | 8 | 3 |
| 1 | 20 | 8 | 10 | 10 | 10 | 8 |
|   | 10 | 7 | 10 | 9 | 8 | 4 |
| 2 | 20 | 7 | 10 | 10 | 10 | 9 |
|   | 10 | 6 | 9 | 9 | 9 | 4 |

TABLE 4

| Compound | Lbs./acre | Oats | Sugar beets | Radish | Flax | Wheat |
|---|---|---|---|---|---|---|
| 8 | 8 | 7 | 10 | 10 | 10 | 6 |
|   | 2 | 7 | 10 | 10 | 10 | 6 |
| 1 | 8 | 7 | 10 | 10 | 10 | 7 |
|   | 2 | 7 | 10 | 10 | 10 | 6 |
| 2 | 8 | 7 | 10 | 10 | 10 | 6 |
|   | 2 | 7 | 10 | 10 | 9 | 4 |

What is claimed is:

1. A process of killing undesired plants comprising applying a herbicidally effective amount of a compound having the formula (1) $R_1OOCCHCHCOOR_2$

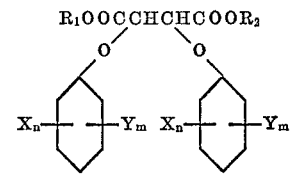

or (2) $R_1OOCCHCH_2COOR_2$

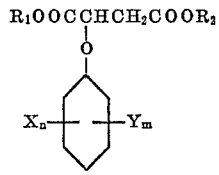

where $R_1$ and $R_2$ are hydrogen, or lower alkyl, X is chlorine, bromine or fluorine, Y is nitro, m is an integer of 1 to 2 and n is an integer of 1 to 3.

2. A process according to claim 1 wherein the compound has Formula 1 and X is chlorine or bromine.

3. A process according to claim 2 wherein the ortho position on the halonitrophenyl groups is substituted with chlorine or bromine.

4. A process according to claim 3 wherein $R_1$ and $R_2$ are lower alkyl, n is 2 or 3 and m is 1.

5. A process according to claim 3 wherein $R_1$ and $R_2$ are hydrogen, n is 2 or 3 and m is 1.

6. A process according to claim 1 wherein the compound has Formula 2 and x is chlorine or bromine.

7. A process according to claim 6 wherein the ortho position on the halonitrophenyl group is substituted with chlorine or bromine.

8. A process according to claim 7 wherein $R_1$ and $R_2$ are lower alkyl, n is 2 or 3 and m is 1.

9. A process according to claim 7 wherein $R_1$ and $R_2$ are hydrogen, n is 2 or 3 and m is 1.

10. A process according to claim 7 wherein the compound is 2,4,5-trichloro-6-nitrophenyl diethyl malate ether.

11. A process according to claim 1 wherein the compound is alpha, beta bis(2,4-dichloro-6-nitrophenyl) tartaric acid.

12. A process according to claim 1 wherein the compound is alpha, beta bis(2,4,5-trichloro-6-nitrophenyl) tartaric acid.

References Cited

UNITED STATES PATENTS 2,603,560   7/1952   Stewart   71—106 X
2,765,224   10/1956   Lambrech   71—112 X JAMES O. THOMAS, Jr., Primary Examiner